Patented July 18, 1950

2,515,304

UNITED STATES PATENT OFFICE 2,515,304

HYDROLYSIS OF 2,5-DIHYDROFURANS TO PRODUCE UNSATURATED DICARBONYL COMPOUNDS

David Gwyn Jones, Norton-on-Tees, England, assignor to Imperial Chemical Industries Limited, a corporation of Great Britain No Drawing. Application October 18, 1946, Serial No. 704,299. In Great Britain October 22, 1945

12 Claims. (Cl. 260—483)

According to the present invention unsaturated dicarbonyl compounds having the general formula $R^1CO \cdot CH=CHCOR^2$ are produced by hydrolysing 2,5-dihydrofurans having the general formula:

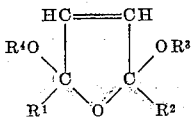

in aqueous medium with or without the aid of acid, where $R^1$ and $R^2$ are selected from hydrogen, alkyl and carboalkoxy (—CO—O—alkyl) groups and $R^3$ and $R^4$ may be saturated or unsaturated aliphatic, or alicyclic hydrocarbon groups. While, for example, the substituent groups may be saturated or unsaturated aliphatic, or alicyclic groups containing up to 10 carbon atoms, preferably they are alkyl groups containing up to 4 carbon atoms because such compounds are more cheaply available and because they react more quickly and afford easier separations.

The overall reaction may be represented by the scheme:

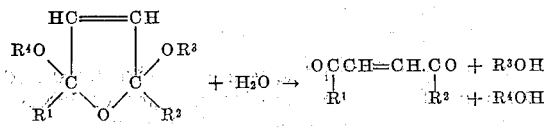

The mechanism of the reaction may apparently be represented by the following scheme but it is to be understood that the process of the invention is for the production of compounds of the formula $R^1COCH=CHCOR^2$ by the hydrolysis of compounds of the formula

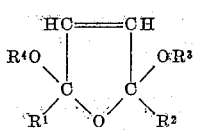

independently of the mechanism of the reaction

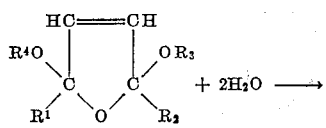

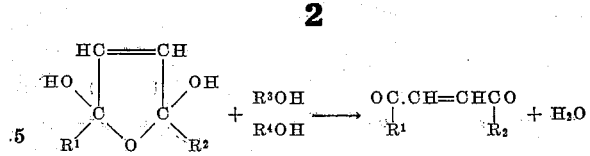

There is some proof for the formation of intermediate cyclic compounds having the above formula in that as the reaction proceeds the insoluble dihydrofuran disappears and there is obtained a solution distinguishable from the aqueous solution of the unsaturated dicarbonyl compound by being colourless. The readiness with which the intermediate colourless compound hydrolyses suggests the formula

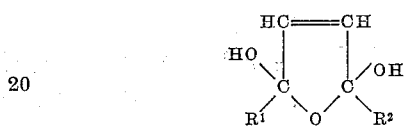

When the starting materials are 2,5-dimethoxy-2,5-dihydrofuran, 2,5-dimethoxy-2,5-dihydrosylvan and 2,5-dimethoxy-2,5-dihydromethyl furoate it is believed that the intermediate compounds are respectively: 2,5-dihydroxy-2,5-dihydrofuran, 2,5-dihydroxy-2,5-dihydrosylvan and 2,5-dihydroxy-2,5-dihydromethyl furoate. The intermediate compounds polymerise readily.

The desired product may be separated from the aqueous reaction mixture by extraction with an organic solvent, drying, removing the solvent and distilling the residue under reduced pressure, for example an absolute pressure of 15 mm. of mercury or less.

The process of the present invention provides a ready method of producing unsaturated ethylenic dialdehydes, from substituted dihydrofurans, which latter can be produced in a small number of chemical stages from the pentosans. The starting materials utilized in the process of the present invention may be prepared as described in British Patent 595,041. The dialdehydes, possessing as they do, a carbon double bond and two aldehydic groups are highly reactive compounds and are, therefore, valuable as intermediates.

Examples of compounds that can be reacted in this way, and the products which can be obtained from them, are given in Table 1. Of these β- acetyl acrolein and αδ-diketo-ethylidene propionic methyl ester are believed to be novel, and were characterised by the preparation of the following derivatives, which had the properties given.

| | Compound | Derivative | Properties of derivative | | |
|---|---|---|---|---|---|
| | | | Melting Pt. | Appearance | Nitrogen |
| | | | °C. | | Per Cent |
| 1 | β-acetyl acrolein | bis-dinitro-phenyl-hydrazone. | 270 | red needles when crystallized from pyridine. | 24.7 (theory 24.5). |
| 2 | αδ-diketo-ethylidene propionic methyl ester. | ___do___ | 264 | scarlet needles when crystallized from nitrobenzene. | 21.7 (theory 22.3). |

*Table 1*

| Starting Material | Formula | Product | Formula |
|---|---|---|---|
| 2,5-dimethoxy-2,5 dihydrofuran | $CH_3O$—C(H)—HC=CH—C(H)—$OCH_3$ (O bridge) | Maleic dialdehyde | CH=CH / CHO CHO |
| 2,5-dimethoxy-2,5-dihydrosylvan | $CH_3O$—C(H)—HC=CH—C($CH_3$)—$OCH_3$ (O bridge) | β-acetyl acrolein | CH=CHCHO / COCH$_3$ |
| 2,5-dimethyl-2,5-dimethoxy-2,5-dihydrofuran | $CH_3O$—C($CH_3$)—HC=CH—C($CH_3$)—$OCH_3$ (O bridge) | αβ-diacetyl ethylene | $CH_3$COCH=CHOCCH$_3$ |
| 2,5-dimethoxy-2,5-dihydromethyl furoate. | $CH_3O$—C(H)—HC=CH—C(COOCH$_3$)—$OCH_3$ (O bridge) | αδ-diketo-ethylidene propionic methyl ester. | OHCCH=CHCCOOCH$_3$ (C=O) |
| 2,5-dicyclohexyloxy-2,5-dihydrofuran | $C_6H_{11}O$—C(H)—HC=CH—C(H)—$OC_6H_{11}$ (O bridge) | maleic dialdehyde | CH=CH / CHO CHO |
| 2,5-diallyloxy-2,5-dihydrofuran | $CH_2$:CH.CH$_2$O—C(H)—HC=CH—C(H)—OCH$_2$CH:CH$_2$ (O bridge) | ___do___ | CH=CH / CHO CHO |

The reaction may be conducted in aqueous solution in the absence of acid, but acid is preferably present. A small amount of acid—generally a trace—will be sufficient. Aqueous acids of up to normal solution strength are suitable. Mineral acids, for example hydrochloric; sulphuric, phosphoric or nitric may be employed but it is preferred not to use a strongly oxidising acid. Other acids that may be used are formic and oxalic. Various temperatures and pressures may be employed, but it is preferred to operate at atmospheric pressure and temperature, or even to cool the reaction mixture.

As stated above the product obtained from 2,5-dimethoxy-2,5-dihydrofuran is maleic dialdehyde and this can be readily separated from the reaction product by extracting with ether, drying, removing the ether, and distilling the residue. Relatively large conversions are achieved, but it is difficult to obtain high yields of maleic dialdehyde since considerable resinification occurs during the separation. When the hydrolysis is carried out with the aid of a small amount of hydrochloric acid, maleic dialdehyde is obtained in yields amounting to 35-40% of the theoretical.

The invention is illustrated but not limited by the following examples.

*Example 1*

50 mls. of 2,5-dimethoxy-2,5-dihydrofuran was shaken with 30 mls. of water at room temperature until it had all dissolved. After two days there was obtained a solution containing maleic dialdehyde.

*Example 2*

60 gms. of 2,5-dimethoxy-2,5-dihydrofuran and 120 mls. of water containing a trace of hydrochloric acid were shaken together at room temperature until solution was complete, which took about 3 days. The resulting yellow solution was continuously extracted with methylated ether until the aqueous layer was nearly colourless and the ethereal extract was deep yellow. The ethereal extract was dried, the ether was distilled off under reduced pressure, and the residue was distilled under reduced pressure (about 15 mm. of mercury) to give 15 gms. of maleic dialdehyde, that is a 38% yield.

I claim:

1. Process for the production of unsaturated dicarbonyl compounds having the formula R$^1$COCH=CHCOR$^2$ which comprises hydrolysing 2,5-dihydrofurans having the general formula

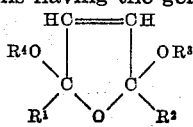

in aqueous medium, where $R^1$ and $R^2$ are selected from the group consisting of: hydrogen, alkyl, and carboalkoxy groups, and $R^3$ and $R^4$ are hydrocarbon groups selected from the group consisting of saturated and unsaturated aliphatic, and alicyclic groups.

2. Process for the production of unsaturated dicarbonyl compounds having the formula $R^1COCH=CHCOR^2$ which comprises hydrolysing 2,5-dihydrofurans having the general formula

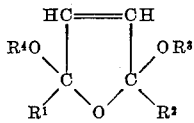

in aqueous medium in the presence of an acid, where $R^1$ and $R^2$ are selected from the group consisting of; hydrogen, alkyl, and carboalkoxy groups and $R^3$ and $R^4$ are hydrocarbon groups selected from the group consisting of saturated and unsaturated aliphatic, and alicyclic groups.

3. A process as claimed in claim 2 when carried out in the presence of a low concentration of mineral acid.

4. Process for the production of unsaturated dicarbonyl compounds having the formula $R^1COCH=CHCOR^2$ which comprises hydrolysing 2,5-dihydrofurans having the general formula

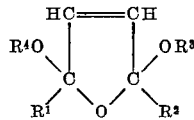

in aqueous medium whilst cooling the reaction mixture, where $R^1$ and $R^2$ are selected from the group consisting of; hydrogen, alkyl, and carboalkoxy groups, and $R^3$ and $R^4$ are hydrocarbon groups selected from the group consisting of saturated and unsaturated aliphatic and alicyclic groups.

5. Process for the production of β-acetyl acrolein which comprises hydrolysing 2,5-dimethoxy-2,5-dihydrosylvan in aqueous medium.

6. Process for the production of αβ-diacetyl ethylene which comprises hydrolysing 2,5-dimethyl-2,5-dimethoxy-2,5-dihydrofuran in aqueous medium.

7. Process for the production of αδ-diketo-ethylidene propionic methyl ester which comprises hydrolysing 2,5-dimethoxy-2,5-dihydro methyl furoate in aqueous medium.

8. Process for the production of maleic dialdehyde which comprises hydrolysing 2,5-dicyclohexyloxy-2,5-dihydrofuran in aqueous medium.

9. Process for the production of maleic dialdehyde which comprises hydrolysing 2,5-diallyloxy-2,5-dihydrofuran in aqueous medium.

10. As a new chemical compound β-acetyl-acrolein.

11. As a new chemical compound αδ-diketo-ethylidene propionic methyl ester.

12. A compound having the general formula $$R-CO-CH=CHCHO$$

wherein R is a radical from the group consisting of $CH_3-$ and $CH_3OCO-$.

DAVID GWYN JONES.

REFERENCES CITED

The following references are of record in the file of this patent:

UNITED STATES PATENTS

| Number | Name | Date |
|---|---|---|
| 2,052,652 | Perkins et al. | Sept. 1, 1936 |